United States Patent [19]

Dolden et al.

[11] Patent Number: 4,571,413

[45] Date of Patent: Feb. 18, 1986

[54] PHENOLIC RESIN COMPOSITION

[75] Inventors: John G. Dolden, Guildford; Sidney G. Fogg, Ashtead, both of England; Werner A. Lidy, Geneva, Switzerland

[73] Assignee: The British Petroleum Company p.l.c., London, England

[21] Appl. No.: 701,097

[22] Filed: Feb. 12, 1985

[30] Foreign Application Priority Data

Feb. 17, 1984 [GB] United Kingdom ............... 8404210

[51] Int. Cl.$^4$ .............................................. C08L 61/10
[52] U.S. Cl. ................................... 524/199; 524/212; 524/215; 524/220; 524/243; 525/504
[58] Field of Search ............... 524/199, 212, 215, 220, 524/243; 525/504

[56] References Cited

U.S. PATENT DOCUMENTS 4,139,524  2/1979  Waddill ............................... 525/504
4,485,229 11/1984  Waddill et al. ..................... 525/504

Primary Examiner—Maurice J. Welsh
Attorney, Agent, or Firm—Morgan, Finnegan, Pine, Foley & Lee

[57] ABSTRACT

A curable phenolic resin composition comprising (A) a major proportion of an aqueous phenolic resole resin and (B) a minor proportion of a poly(1,2-alkylene oxide) having terminating groups selected from the group comprising —$NH_2$, —$CONH_2$, —$CH.CO.NH_2$ and —$OCONH_2$ groups. The compositions are preferably cured with an acid catalyst and post cured at an elevated temperature.

9 Claims, No Drawings

PHENOLIC RESIN COMPOSITION

The present invention relates to a curable phenolic resin composition and to a process for producing a cured phenolic resin composition.

The applicants have found that the inclusion of certain polyethers in curable aqueous phenolic resole resin compositions improves the impact strength of the compositions when cured. The cured compositions may also have improved flexural properties.

Thus according to the present invention a curable phenolic resin composition comprises (A) a major proportion of an aqueous phenolic resole resin and (B) a minor proportion of a poly(1,2-alkylene oxide) having terminating groups selected from the group comprising —$NH_2$, —$CONH_2$, —$NH.CO.NH_2$ and —$OCONH_2$ groups.

The invention includes a process for producing a cured phenolic resin composition which method comprises mixing an aqueous phenolic resole resin and a minor proportion of a poly(1,2—alkylene oxide) having terminating groups selected from the group comprising —$NH_2$, —$COHN_2$, —$NH.CO.NH_2$ and —$OCONH_2$ groups and curing the mixture.

Aqueous phenolic resole resins suitable for use in the present invention are known. The most common components of a phenolic resin are phenol and formaldehyde and the molar ratio of phenol to formaldehyde of resins suitable for use in the present invention is preferably from 1:1 to 1:2, more preferably 1:1.3 to 1:2. Alternative phenolic starting materials include, alkyl-substituted phenols, e.g. cresols, xylenols, p-tert-butylphenol, p-phenylphenol and nonylphenol and diphenols, such as resorcinol and bisphenol-A. Acetaldehyde and furfuraldehyde may be used in place of formaldehyde. The resole preferably has a viscosity of not more than 20 Poise, preferably 1 to 20 Poise (0.1 to 2.0 Pa.s).

Poly(1,2-alkylene oxides) having terminating groups selected from the group comprising —$NH_2$, —$CONH_2$, —$NH.CO.NH_2$ and —$OCONH_2$ are known. For example, an amino terminated poly(oxypropylene) and an ureido terminated poly(oxypropylene) are commercially available from Texaco under the trade marks Jeffamine D2000 and Jeffamine BUD 2000 respectively. Each of these commercial products has a molecular weight of approximately 2000. The poly(1,2-alkylene oxide) is preferably derived from one or more $C_2$ to $C_4$ alkylene oxides. Preferably, the poly(1,2-alkylene oxide) is derived from propylene oxide or ethylene oxide or a mixture thereof. The poly(1,2-alkylene oxide) may have one or more groups other than 1,2-alkylene oxide groups in the chain such as for example —NH—, —CONH—, —NH.CO.NH— or —OCOHN—. Such compounds may, for example, have a general formula;

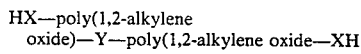

where
X and Y are the same or different and are selected from the group comprising —NH—, —CONH—, —N.CO.NH— or —OCONH—, the poly(1,2 alkylene oxide) groups may be the same or different.

The molecular weight of the polyether is preferably in the range 400 to 10000. The amount of the polyether mixed with the phenolic resin is preferably in the range 2 to 45 parts by weight per 100 parts by weight of the aqueous phenolic resole resin.

The amount of water included in the aqueous resole is preferably at least 10 parts by weight per 100 parts by weight of the phenolic resin. The upper limit is determined by the compatability of water and is typically not more than 40 parts by weight per 100 parts by weight of the phenolic resin. A preferred range for the water content of the aqueous resole is from 10 to 25 parts by weight per 100 parts by weight of the phenolic resin. Additional water may be added to and mixed with the other components at any stage prior to curing.

The compositions according to the present invention may also contain fillers and other additives conventionally used in phenolic resole resin compositions. Suitable fillers include china clay, limestone, barytes, silicates, wood flour and glass fibre.

The components of the compositions according to the present invention may be mixed together using conventional mixing equipment and techniques and may be moulded and cured using conventional curing systems and methods. The compositions may for example be cured by heating to a temperature of from 50° to 80° C. for a period from 12 to 24 hours. Preferably, however the compositions are cured using a conventional acid catalyst. Suitable acid catalysts include phosphoric acid, an aryl sulphonic acid, e.g. p-toluene sulphonic acid, or a mixture thereof. The acid catalyst is preferably used as an aqueous solution of the acid. Typically the water content of the acid catalyst is from 25 to 50% by weight. Preferably, the resins are post cured at an elevated temperature, preferably 50 to 90° C. for 2 to 8 hours.

Organic solvents such as for example acetone may reduce the advantageous effect of the inclusion in the composition of the polyether. Preferably, therefore, the compositions according to the present invention should contain little or no organic solvent.

The compositions according to the present invention which are curable with an acid catalyst preferably have an exotherm temperature of at least 50° C. in 30 minutes and a pot life of not more than 30 minutes as determined by the test methods described in Example 1.

The compositions according to the present invention may be used, for example, in the preparation of fibre reinforced composite materials and foamed phenolic compositions.

The invention is illustrated by the following examples.

EXAMPLE 1

50 g of an amine terminated poly(1,2-alkylene oxide) was mixed with 450 g of a resole resin by stirring at 60° C. for one hour. The blend was allowed to cool to room temperature (approximately 20° C.) and was found to be a homogeneous blend at this temperature. The Brookfield viscosity of the blend at 25° C. using a No. 3 spindle was 60 Poise (6 Pa.s).

The amine terminated poly(1,2-alkylene oxide) was a commercially available polyether sold under the trade mark Jeffamine D 2000 by Texaco. This polyether was a diamino poly(oxypropylene) having a molecular weight of approximately 2000.

The phenolic resin was a commercially available aqueous phenol-formaldehyde resole, having a Brookfield viscosity at 25° C. of 12 Poise (1.2 Pa.s) and a mole ratio of phenol to formaldehyde of 1:1.5. The free water content of the resin was approximately 12% by weight.

Exotherm Test 100 g of the blend of aqueous phenolic resole and polyether was placed in an insulated paper cup, height 8 cm, base diameter 4 cm and open end diameter 6.5 cm. The temperature was adjusted to 20° C. 12 g of a 6.1 N solution of hydrochloric acid in ethylene glycol was added to the blend and stirred for 45 seconds and the rise in temperature with time recorded.

The blend had an exotherm temperature in excess of 110° C. after only 12 minutes i.e. the temperature rose to more than 110° C. in 12 minutes.

Pot life Test 100 g of the blend was placed in a paper cup at 23° C. 8 g of an aqueous solution of p-toluene sulphonic acid and phosphoric acid was added to the blend and the mixture stirred for 45 seconds. The time taken from the end of stirring to the first appearance of cloudiness in the mixture was recorded as the pot life. The composition had a pot life of less than 30 minutes.

EXAMPLE 2

Example 1 was repeated except that a polyether terminated with ureido groups was used in place of the amino terminated polyether. The ureido terminated polyether was a commercially available product sold by Texaco under the trade mark Jeffamine BUD 2000. This polyether was a diureido poly(oxypropylene) having a molecular weight of approximately 2000. The exotherm temperature of the blend was more than 50° C. in 30 minutes and the pot life of the blend was less than 30 minutes.

200 g samples of each of the blends produced in Examples 1 and 2 were mixed with 20 g of a commercially available acid catalyst for one minute. The acid catalyst was an aqueous solution of phosphoric acid and p-toluene sulphonic acid.

The mixtures were then used to fill moulds comprising two 203 mm square glass plates separated by a 5 mm thick strip of rubber arranged around three sides of the square. The moulds were arranged upright to enable air bubbles to escape. The compositions were allowed to cure at room temperature (approximately 20° C.) for 24 hours and were then post cured for six hours at 80° C. The moulds were allowed to cool and then the cured sheets removed.

Specimens were cut from the cured sheets and used to determine the Charpy impact resistance (BS2782 pt 3 Method 3514 1977 using unnotched test specimen) and the flexural strength, strain and modulus (ASTM D790 M-81, Method 1). The results are given in Table 1. For comparison the Charpy impact resistance and flexural properties of the aqueous resole without a polyether additive are also given in Table 1.

The results given in Table 1 show that the compositions according to the present invention have a higher impact resistance, and a lower flexural modulus. The flexural strength and flexural strain are higher than the comparative composition which did not contain a polyether additive.

TABLE 1

| Composition | Charpy Impact Resistance (KJm$^{-2}$) | Flexural Properties Strength (MPa) | Flexural Properties Strain (%) | Flexural Properties Modulus (MPa) |
| --- | --- | --- | --- | --- |
| Example 1 | 7.06 | 74.9 | 3.72 | 2309 |
| Example 2 | 10.21 | 66.9 | 3.23 | 2278 |
| Comparative Composition | 4.4 | 48.9 | 1.87 | 2554 |

EXAMPLE 3

20 parts by weight of an amine terminated polyether were mixed with 80 parts by weight of a phenolic resin by stirring at 50° C. under nitrogen until a homogeneous blend was obtained.

The amine terminated polyether was Jeffamine D2000, the same commercially available product as used in Example 1.

The phenolic resin was the same commercially available low viscosity, aqueous phenol-formaldehyde resole as used in Example 1.

The viscosity of the blend was reduced by heating to 60° C. and then the blend was used to impregnate two layers of unidirectional glass fibre matting. The glass fibre matting comprised glass fibres which were substantially unidirectional with a relatively small number of transverse filaments binding the fibres together. The fibre mats were laid in a mould with the bulk of their fibres running in the same direction. The glass fibre content of the composite was 23% by weight. A roller was used to remove air bubbles from this composite material which was then clamped between glass plates. The clamped composition was then cured at 50° C. for 6 hours and then post cured at 80° C. for 12 hours. The plates were arranged vertically during curing to allow air bubbles to escape.

The Charpy impact strength of the composite material was measured (according to BS2782 pt 3 Method 351A) in the direction of the glass fibres and at 90° C. to the fibre direction. The results are given in Table 1.

For comparison, the impact strength was determined of a composite composition comprising 23% by weight of glass bonded in a phenolic resin in which the phenolic resin was the resole as used in the composite according to the invention, except that instead of the amine terminated polyether, the resole contained 4% by weight of a conventional acid catalyst. The results given in Table 2 show that the use of the amine terminated polyether increases the impact strength of the composite material, compared to the comparative composition.

TABLE 2

| Composition | Impact Strength (KJm$^{-2}$) In fibre direction | At 90° C. to fibre direction |
| --- | --- | --- |
| According to invention | 3.5 | 93.0 |
| Comparative | 2.7 | 68.3 |

We claim:

1. A curable phenolic resin composition comprising:
   (A) a major proportion of an aqueous phenolic resole resin, and
   (B) a minor proportion of a poly(1,2-alkylene oxide) having terminating groups selected from the group comprising —NH$_2$, —CONH$_2$, —NH.CO.NH$_2$ and —OCONH$_2$.

2. A curable phenolic resin composition as claimed in claim 1 in which the phenolic resin is a resole containing from 10 to 25 parts by weight of water per 100 parts by weight of resole.

3. A composition as claimed in claim 1 in which the poly(1,2-alkylene oxide) is derived from one or more $C_2$ to $C_4$ alkylene oxides.

4. A composition as claimed in claim 1 in which the poly(1,2-alkylene oxide) is derived from propylene oxide, ethylene oxide or a mixture thereof.

5. A composition as claimed in claim 1 which comprises a poly(oxypropylene) terminated with amino groups or ureido groups.

6. A composition as claimed in claim 1 in which from 2 to 45 parts by weight of the poly(1,2-alkylene oxide) terminated with —$NH_2$, —$CONH_2$, —$NH.CO.NH_2$ or $OCONH_2$ groups is mixed with the phenolic resin.

7. A process for producing a cured phenolic resin composition comprising mixing and aqueous phenolic resole resin and a minor proportion of a poly(1,2-alkylene oxide) having terminating groups selected from the group comprising —$NH_2$, —$CONH_2$, —$NH.CO.NH_2$ and —$OCONH_2$ groups, and curing the mixture.

8. A process as claimed in claim 7 in which the composition is cured with an acid catalyst.

9. A process as claimed in claim 7 or claim 8 in which the composition is post cured at a temperature of from 60° to 90° C. for 2 to 8 hours.

* * * * *